(12) United States Patent
Hausler et al.

(10) Patent No.: US 12,447,808 B2
(45) Date of Patent: Oct. 21, 2025

(54) STRUCTURAL ASSEMBLY AND VEHICLE HAVING STRUCTURAL ASSEMBLY

(71) Applicant: Ford Global Technologies, LLC, Dearborn, MI (US)

(72) Inventors: Henry W. Hausler, New Hudson, MI (US); Patrick Daniel Maguire, Ann Arbor, MI (US); Scott J. Bell, Northville, MI (US); Conor Daniel Hennessey, South Hadley, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 17/966,382

(22) Filed: Oct. 14, 2022

(65) Prior Publication Data

US 2024/0123807 A1    Apr. 18, 2024

(51) Int. Cl.
*B60K 1/04*      (2019.01)
*B62D 21/02*     (2006.01)
*H01M 10/0525*   (2010.01)
*H01M 50/204*    (2021.01)
*H01M 50/244*    (2021.01)
(Continued)

(52) U.S. Cl.
CPC .............. *B60K 1/04* (2013.01); *B62D 21/02* (2013.01); *H01M 10/0525* (2013.01); *H01M 50/204* (2021.01); *H01M 50/244* (2021.01); *H01M 50/249* (2021.01); *H01M 50/262* (2021.01);
(Continued)

(58) Field of Classification Search
CPC .. B60K 1/04; B60K 2001/0438; B62D 21/02; B62D 21/07; B62D 25/20; H01M 10/0525; H01M 50/204; H01M 50/244; H01M 50/249; H01M 50/262; H01M 2220/20; B60L 50/66

See application file for complete search history.

(56) References Cited

U.S. PATENT DOCUMENTS 7,610,978 B2 * 11/2009 Takasaki ................ B62D 25/20
                                               429/96
8,702,161 B2   4/2014 Charbonneau et al.
(Continued)

FOREIGN PATENT DOCUMENTS

| CN | 108357565     | 8/2018  |             |
|----|---------------|---------|-------------|
| CN | 216709422 U * | 6/2022  | ...... B60K 1/04 |
| KR | 102344152 B1 *| 1/2022  |             |

*Primary Examiner* — James A Shriver, II
*Assistant Examiner* — Ian Bryce Shelton
(74) *Attorney, Agent, or Firm* — Burris Law, PLLC

(57) ABSTRACT

A structural assembly for an electric vehicle includes a vehicle frame, a battery structure, a pair of mounting structures, and a plurality of fasteners. The vehicle frame includes opposed longitudinal rails. The battery structure is disposed between the opposed longitudinal rails and includes a battery housing configured to house power storage units. Each mounting structure is secured to a respective side of the battery housing and supports a corresponding longitudinal rail. The plurality of fasteners extend through a corresponding mounting structure of the pair of mounting structures and a corresponding longitudinal rail of the opposed longitudinal rails to secure the vehicle frame and the battery structure to each other. An outer periphery of the corresponding mounting structure is substantially flush with an outer periphery of the corresponding longitudinal rail.

20 Claims, 7 Drawing Sheets

(51) Int. Cl.
  *H01M 50/249*  (2021.01)
  *H01M 50/262*  (2021.01)
(52) U.S. Cl.
  CPC . *B60K 2001/0438* (2013.01); *H01M 2220/20* (2013.01)

(56) References Cited

U.S. PATENT DOCUMENTS

| | | | |
|---|---|---|---|
| 10,358,168 B2 | 7/2019 | Atsumi et al. | |
| 10,720,620 B1* | 7/2020 | Grace | H01M 50/244 |
| 10,780,926 B2* | 9/2020 | Lee | B60K 1/04 |
| 11,059,361 B2* | 7/2021 | Bohmer | B60L 50/64 |
| 11,267,326 B2* | 3/2022 | Nagaya | B62D 25/2054 |
| 11,299,205 B2* | 4/2022 | Saje | B62D 27/06 |
| 11,318,992 B2* | 5/2022 | Sasaoka | B62D 21/157 |
| 11,383,766 B2* | 7/2022 | Takahashi | B62D 27/02 |
| 11,447,183 B2* | 9/2022 | Shioya | B62D 21/11 |
| 11,958,541 B2* | 4/2024 | Kemppainen | B62D 24/00 |
| 12,065,196 B2* | 8/2024 | Mueller-Brincken | B60K 1/04 |
| 2004/0163859 A1* | 8/2004 | Chernoff | B62D 21/07 180/65.1 |
| 2009/0152034 A1* | 6/2009 | Takasaki | B60L 50/52 180/68.5 |
| 2012/0090907 A1 | 4/2012 | Store et al. | |
| 2019/0100090 A1* | 4/2019 | Matecki | H01M 50/204 |
| 2019/0263450 A1* | 8/2019 | Inoue | B62D 21/152 |
| 2019/0344829 A1* | 11/2019 | Abushawashi | B62D 21/157 |
| 2020/0070639 A1* | 3/2020 | Bohmer | B62D 21/07 |
| 2020/0189665 A1* | 6/2020 | Friedman | B62D 29/041 |
| 2020/0369140 A1* | 11/2020 | McCarron | B62D 21/152 |
| 2020/0406735 A1* | 12/2020 | Nagaya | B62D 21/09 |
| 2021/0016831 A1* | 1/2021 | Sasaoka | B62D 27/02 |
| 2021/0039716 A1* | 2/2021 | Sasaoka | B62D 27/065 |
| 2021/0245809 A1* | 8/2021 | Saje | B62D 21/10 |
| 2021/0276621 A1* | 9/2021 | Suzaki | B62D 21/07 |
| 2022/0118862 A1* | 4/2022 | Hara | B62D 21/09 |
| 2022/0379963 A1* | 12/2022 | Kamei | B62D 25/20 |
| 2022/0402346 A1* | 12/2022 | Hara | B62D 21/07 |
| 2023/0099867 A1* | 3/2023 | Kemppainen | B62D 24/00 296/203.01 |
| 2023/0198072 A1* | 6/2023 | Lee | H01M 50/224 429/99 |
| 2023/0223635 A1* | 7/2023 | Jeong | H01M 50/262 429/99 |
| 2023/0226898 A1* | 7/2023 | Lee | B60K 1/04 180/68.5 |
| 2023/0264562 A1* | 8/2023 | Kamemoto | B62D 21/11 180/65.1 |
| 2024/0021944 A1* | 1/2024 | Shin | H01M 50/262 |
| 2024/0034140 A1* | 2/2024 | Shin | H01M 50/262 |

* cited by examiner

STRUCTURAL ASSEMBLY AND VEHICLE HAVING STRUCTURAL ASSEMBLY

FIELD

The present disclosure relates to a structural assembly and a vehicle having a structural assembly.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these issues related to the integration of rechargeable battery packs in electric vehicles.

SUMMARY

This section provides a general summary of the disclosure and is not a comprehensive disclosure of its full scope or all of its features.

In one form, the present disclosure provides a structural assembly for an electric vehicle that includes a vehicle frame, a battery structure, a pair of mounting structures, and a plurality of fasteners. The vehicle frame includes opposed longitudinal rails. The battery structure is disposed between the opposed longitudinal rails and includes a battery housing configured to house power storage units. Each mounting structure is secured to a respective side of the battery housing and supports a corresponding longitudinal rail. The plurality of fasteners extend through a corresponding mounting structure of the pair of mounting structures and a corresponding longitudinal rail of the opposed longitudinal rails to secure the vehicle frame and the battery structure to each other. An outer periphery of the corresponding mounting structure is substantially flush with an outer periphery of the corresponding longitudinal rail.

In variations of the structural assembly of the above paragraph, which may be implemented individually or in combination: each mounting structure of the pair of mounting structures includes internal stiffening members; each mounting structure of the pair of mounting structures includes an inboard portion having a first height substantially equal to a height of the battery housing and an outboard portion having a second height, the first height being greater than the second height, the corresponding longitudinal rail of the opposed longitudinal rails being supported on the outboard portion of the corresponding mounting structure; the plurality of fasteners extend through the outboard portion of the corresponding mounting structure of the pair of mounting structures and the corresponding longitudinal rail of the opposed longitudinal rails to secure the vehicle frame and the battery structure to each other; the corresponding longitudinal rail of the opposed longitudinal rails being spaced apart from the inboard portion of the corresponding mounting structure; the corresponding longitudinal rail of the opposed longitudinal rails are positioned below an uppermost region of the inboard portion of the corresponding mounting structure; each mounting structure of the pair of mounting structures includes a first cross-sectional area and each longitudinal rail of the opposed longitudinal rails includes a second cross-sectional area, the first cross-sectional area is greater than the second cross-sectional area; a plurality of mounts are secured to the opposed longitudinal rails; and a plurality of body isolators, each body isolator disposed on a respective mount and between the respective mount and the vehicle body.

In another form, the present disclosure provides a structural assembly for an electric vehicle that includes a vehicle frame, a battery structure, a pair of mounting structures, and a plurality of fasteners. The vehicle frame is distinct from a vehicle body and includes opposed longitudinal rails. The battery structure is disposed between the opposed longitudinal rails and includes a battery housing configured to house power storage units. Each mounting structure is proximate to a respective side of the battery housing and includes internal stiffening members. Each mounting structure includes an inboard portion and an outboard portion. The inboard portion has a first height substantially equal to a height of the battery housing. The outboard portion has a second height. The first height is greater than the second height. The outboard portion supports a corresponding longitudinal rail of the opposed longitudinal rails. The plurality of fasteners extend through the outboard portion of a corresponding mounting structure of the pair of mounting structures and a corresponding longitudinal rail of the opposed longitudinal rails to secure the vehicle frame and the battery structure to each other.

In variations of the structural assembly of the above paragraph, which may be implemented individually or in combination: an outer periphery of the corresponding mounting structure is substantially flush with an outer periphery of the corresponding longitudinal rail and the vehicle frame includes a front section including a first width, a rear section including a second width, and a mid-section including the opposed longitudinal rails and having a third width that is greater than the first width and the second width, the battery structure is secured to the mid-section of the vehicle frame.

In yet another form, the present disclosure provides an electric vehicle that includes a vehicle body, a vehicle frame, a battery structure, a pair of mounting structures, and a plurality of fasteners. The vehicle frame is distinct from the vehicle body includes opposed longitudinal rails. The battery structure is disposed between the opposed longitudinal rails and includes a battery housing configured to house power storage units. Each mounting structure is secured to a respective side of the battery housing and supports a corresponding longitudinal rail. The plurality of fasteners extend through a corresponding mounting structure of the pair of mounting structures and a corresponding longitudinal rail of the opposed longitudinal rails to secure the vehicle frame and the battery structure to each other. An outer periphery of the corresponding mounting structure is substantially flush with an outer periphery of the corresponding longitudinal rail.

In variations of the electric vehicle of the above paragraph, the vehicle body includes a pair of opposed rockers, each rocker of the opposed rockers is supported by the vehicle frame by the plurality of mounts and the plurality of body isolators.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
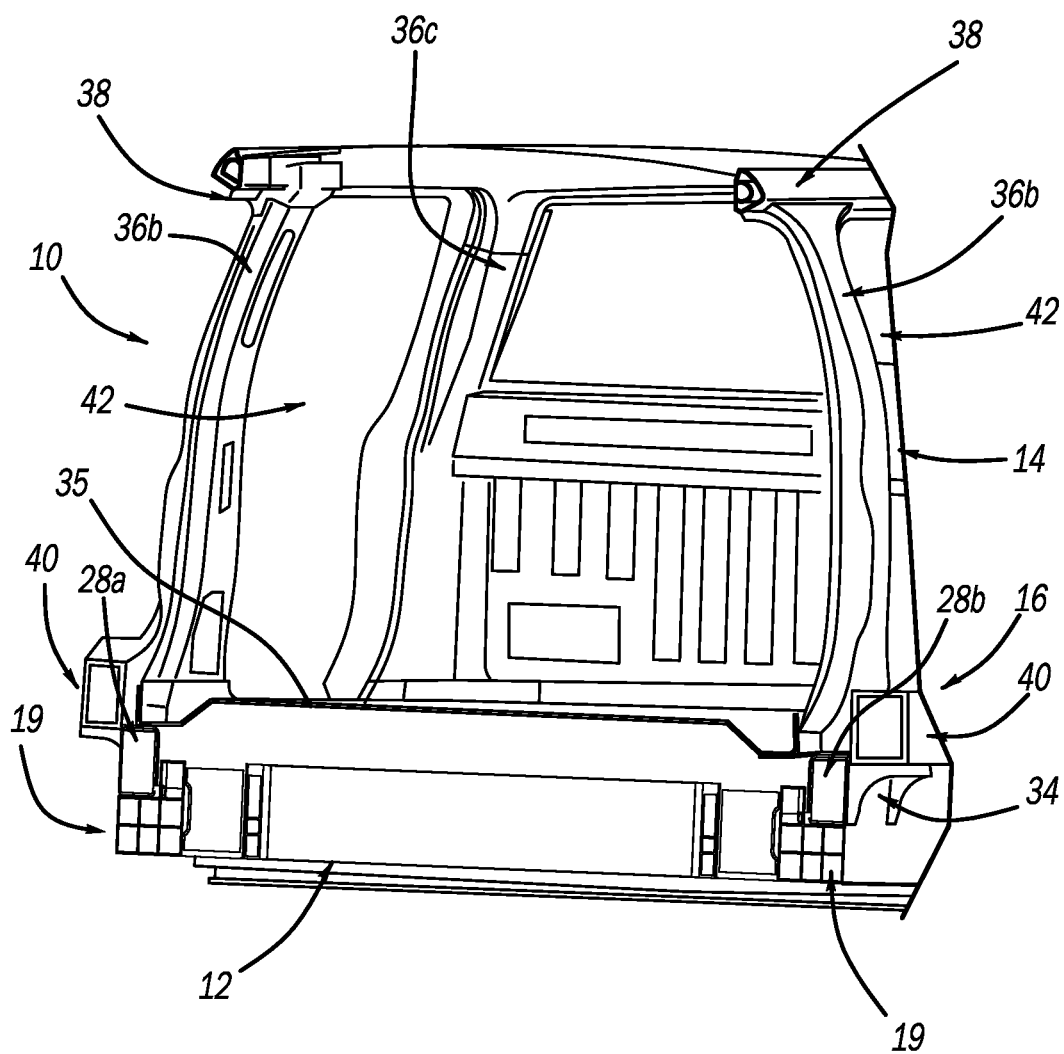
FIG. 1 is a cross-sectional perspective view of a vehicle according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery structure 12, a vehicle body 14 and a vehicle frame 16. The battery structure 12 may be rechargeable and may include lithium-ion batteries, solid-state batteries, or any other suitable electrical power storage units. The battery structure 12 may be disposed at various locations of the vehicle 10 and may be secured to the vehicle frame 16. In this way, the battery structure 12 is supported by the vehicle frame 16 and is remote from a passenger cabin and cargo compartments (not shown) of the vehicle 10, therefore, not occupying space that would otherwise be available for passengers or cargo. The battery structure 12 powers one or more motors to drive a set of drive wheels. For example, the battery structure 12 may power a rear motor (not shown) to drive rear wheels (not shown) of a set of rear wheels via a rear axle (not shown) and/or may power a front motor (not shown) to drive front wheels (not shown) of a set of front wheels via a front axle (not shown).

With reference to FIGS. 2-5, the battery structure 12 includes a lid 15, an outer support frame or battery housing 18 and a pair of mounting structures or frames 19. The lid 15 is removably coupled to the top of the battery housing 18 via mechanical fasteners such as bolts or screws (not shown), for example. In this way, the lid 15 may be removed to service the battery arrays (not shown) disposed within the battery housing 18. A seal (not shown) is disposed around a periphery of the battery housing 18 and is engaged with the battery housing 18 and the lid 15. In this way, fluids, debris and other materials are inhibited from entering into the battery housing 18. Internal cross members (not shown) are disposed within the battery housing 18 and extend in a transverse direction of the vehicle 10. The internal cross members abut against a bottom wall 27 (FIGS. 3 and 5) of the battery housing 18. The internal cross members are spaced apart along a longitudinal direction of the vehicle 10 and may connect opposed side walls of the battery housing 18.

Each mounting structure 19 is made of a metal material such as aluminum, for example, and is secured to a side of the battery housing 18 of the battery structure 12. Each mounting structure 19 is also configured to mount the battery structure 12 to the vehicle frame 16. That is, fasteners 31 (FIGS. 3 and 5) extend through the mounting structure 19 and the vehicle frame 16 to secure the battery structure 12 to the vehicle frame 16. In the example illustrated, each mounting structure 19 has a length that is greater than a length of the battery housing 18 such that each mounting structure 19 extends forward and rearward of the battery housing 18. The vehicle frame 16 is described in greater detail below, but in the example illustrated, the length of each mounting structure 19 is also greater than a length of each longitudinal rail 28a, 28b of a pair of opposed longitudinal rails 28a, 28b of the vehicle frame 16.

Each mounting structure 19 supports a corresponding longitudinal rail 28a, 28b of the vehicle frame 16 and includes a cross-sectional area that is greater than a cross-sectional area of the corresponding longitudinal rail 28a, 28b. Each mounting structure 19 also includes internal stiffening members 32 that are configured to absorb energy during a side vehicle impact event. In the example illustrated, the internal stiffening members 32 are ribs or webbing that extend in the horizontal and/or vertical direction. In other examples, a foam material may be provided instead of, or in addition to, the internal stiffening members 32 to further absorb energy during a side vehicle impact event.

Each mounting structure 19 includes an inboard portion 70 and an outboard portion 72. The inboard portion 70 includes the internal stiffening members 32 and has a height H1 (FIG. 5) that is substantially equal to a height H2 (FIG. 5) of the battery housing 18. The inboard portion 70 is positioned inboard relative to a corresponding longitudinal rail 28a, 28b. The outboard portion 72 is supported by the corresponding longitudinal rail 28a, 28b of the vehicle frame 16 and includes the internal stiffening members 32. The fasteners 31 extend vertically through the outboard portion 72 of the mounting structure 19 and the corresponding longitudinal rail 28a, 28b of the vehicle frame 16 to removably secure the battery structure 12 to the vehicle frame 16. In the example provided, the fasteners 31 are threaded fasteners that threadably engage with a tapped bore (not shown) of the corresponding longitudinal rail 28a, 28b or a nut (not shown). The outboard portion 72 has a height H3 that is less than the height H1 of the inboard portion 70 and less than the height H2 of the battery housing 28. The outboard portion 72 also has a length that is greater than the length of the battery housing 18 and greater than the length of the inboard portion 70 such that the outboard portion 72 extends forward and rearward of the inboard portion 70 and the battery housing 18.

The vehicle body 14 is separate (distinct) from and mounted on the vehicle frame 16. Stated differently, the vehicle body 14 is mounted on a plurality of mounts 34 secured to the vehicle frame 16. The vehicle body 14 includes cross members 35 (only one shown in FIG. 1) extending above the vehicle frame 16 and the battery structure 12.

With reference to FIG. 1, the vehicle body 14 also includes a front end (not shown), a plurality of pillars (e.g., A-pillars (not shown), B-pillars 36b, C-pillars 36c (one of which is shown), hinge pillars (not shown)), roof rails 38, and rockers 40. In one example, the front end includes, inter alia, a bumper (not shown) that extends in a transverse direction relative to a longitudinal direction of the vehicle 10 and is secured to the vehicle frame 16 by energy absorbing members.

The A-pillars, the B-pillars 36b, the hinge pillars, the rockers 40 and the roof rails 38 cooperate to define front door openings (not shown) in the vehicle body 14. The B-pillars 36b, the C-pillars 36c, the rockers 40 and the roof rails 38 cooperate to define rear door openings 42 in the vehicle body 14. Doors (not shown) are rotatably coupled to the vehicle body 14 (e.g., hinge pillars or the B-pillars 36b) to be rotated between a closed position in which the doors are disposed within the front door openings or the rear door openings 42, and an open position in which the doors are removed from the front door openings or the rear door openings 42.

Each rocker 40 is elongated and extends along the longitudinal direction of the vehicle 10. A front end of the rocker 40 is housed within or otherwise secured to a respective hinge pillar (i.e., the front end of the rocker 40 may be disposed within a cavity of the respective hinge pillar).

The vehicle frame 16 is made of a metal material such as steel, for example, and may be manufactured by a roll forming process, for example. The vehicle frame 16 is the main supporting structure of the vehicle 10, to which various components are attached either directly or indirectly. For example, suspension mounts 30 (FIGS. 2 and 3) are secured to the vehicle frame 16 and secures a suspension system to the vehicle frame 16. The suspension system provides a smooth ride by absorbing energy from various road bumps while driving, and assists the wheels (not shown) to remain in contact with the road. The suspension system includes various components such as upper and lower control arms, springs, shock absorbers, struts, and ball joints, for example. In another example, a spare tire is secured to the vehicle frame 16.

Figure 2:
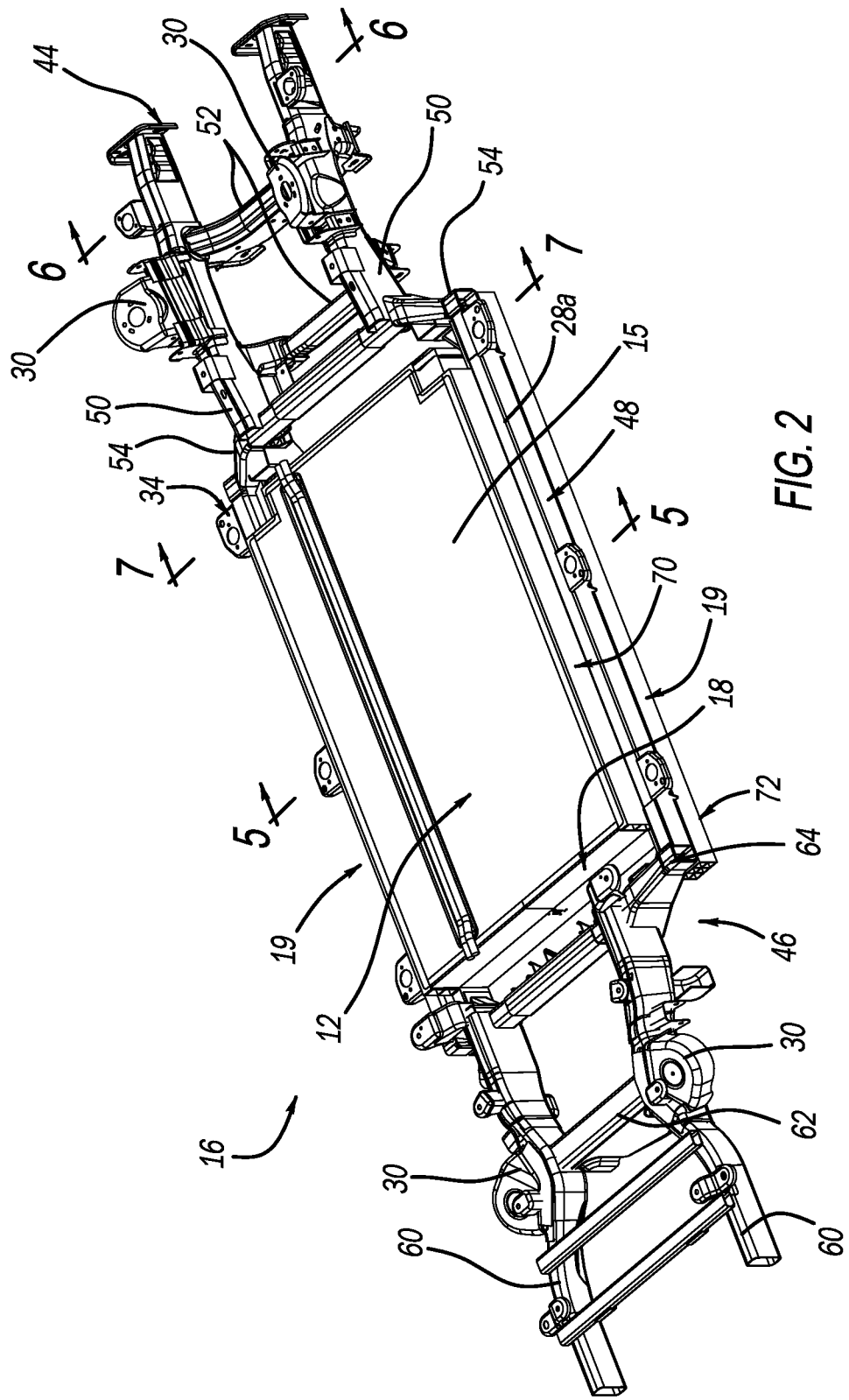
FIG. 2 is a top perspective view of a vehicle frame and battery structure of the vehicle of FIG. 1.
Figure 3:
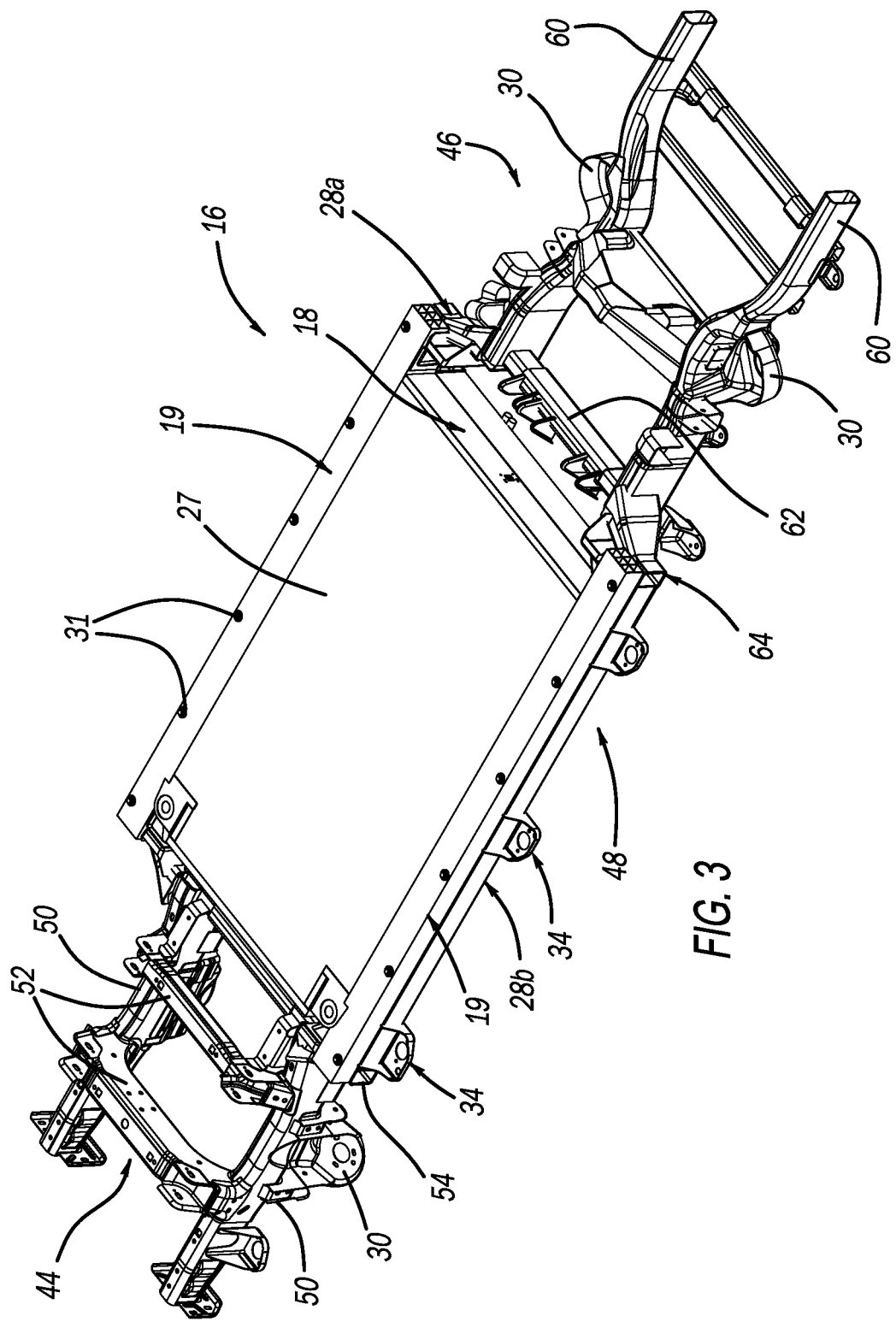
FIG. 3 is a bottom perspective view of the vehicle frame and the battery structure of FIG. 2.
Figure 4:
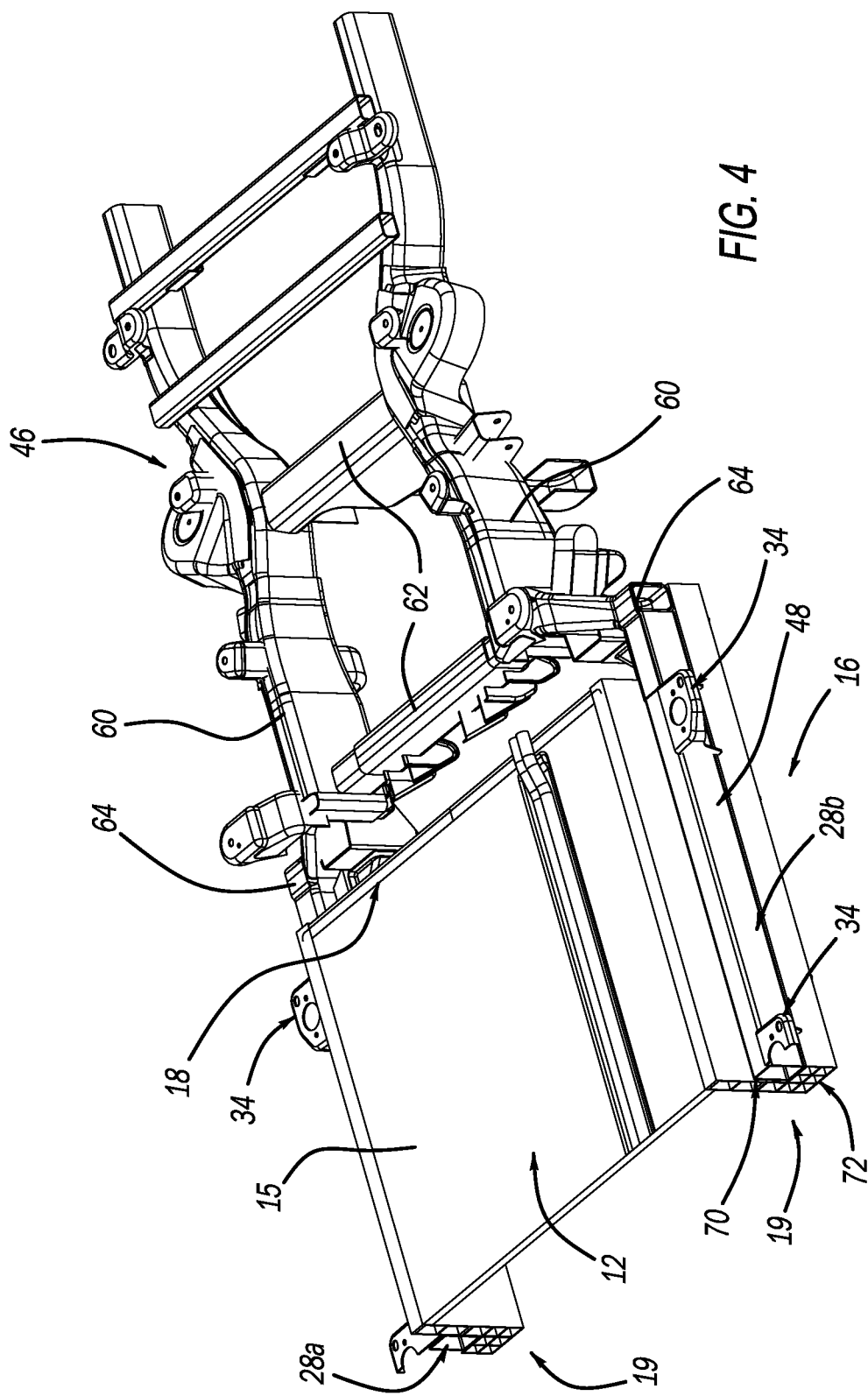
FIG. 4 is a cross-sectional perspective view of the vehicle frame and the battery structure of FIG. 2.

With reference to FIGS. 2-4, the vehicle frame 16 includes a front section or front torque box 44 (FIGS. 2 and 3), a rear section or rear torque box 46 and, and a mid-section 48 disposed between the front and rear sections 44, 46. In some forms, the front section 44, the rear section 46, and the mid-section 48 may be separate parts that are fixed to each other via welding, for example, or any other suitable attachment means. As shown in FIGS. 2-4, the front section 44 extends from a front end of the mid-section 48 and includes a pair of opposed longitudinal members 50, a plurality of connecting members 52, and a pair of opposed arms 54. The longitudinal members 50 extend generally along the longitudinal direction of the vehicle 10 on opposite lateral sides of the vehicle 10 and are interconnected via the connecting members 52 extending in a transverse direction relative to the longitudinal direction of the vehicle 10. Front ends of the longitudinal members 50 are secured to the bumper structure (not shown), for example. The suspension mounts 30 are secured to the longitudinal members 50 and secure the suspension system to the front section 44 of the vehicle frame 16. Each arm 54 extends outwardly from a rear end of a respective longitudinal member 50 to the mid-section 48. Each arm 54 overlaps the outboard portion 72 of a respective mounting structure 19 and may also help support the outboard portion 72 of the respective mounting structure 19.

The rear section 46 extends from a rear end of the mid-section 48 and includes a pair of opposed longitudinal members 60, a plurality of connecting members 62, and a pair of opposed arms 64. The longitudinal members 60 extend generally along the longitudinal direction of the vehicle 10 on opposite lateral sides of the vehicle 10 and are interconnected via the connecting members 62 extending in a transverse direction relative to the longitudinal direction of the vehicle 10. A mid-portion of each longitudinal member 60 may protrude inwardly toward a center of the vehicle frame 16. Suspension mounts 30 may be secured to a respective longitudinal member 60 at the mid-portion and are configured to mount a vehicle component (e.g., the suspension system) to the rear section 46 of the vehicle frame 16. Each arm 64 extends outwardly from a front end of a respective longitudinal member 60 to the mid-section 48. Each arm 64 overlaps the outboard portion 72 of a respective mounting structure 19 and may also help support the outboard portion 72 of the respective mounting structure 19.

The mid-section 48 includes the opposed longitudinal rails 28a, 28b that are spaced apart from each other on opposite lateral sides of the vehicle 10 and that are substantially parallel. It should be understood that the mid-section 48 does not include cross members to accommodate the battery structure 12. The plurality of mounts 34 are secured to and along a respective rail 28a, 28b of the mid-section 48 of the vehicle frame 16. Each rail 28a, 28b is located between a respective rocker 40 and the battery housing 18 of the battery structure 12. The mid-section 48 of the vehicle frame 16 is a region of the vehicle frame 16 where the rails 28a, 28b are forward a location where the rear section 46 angles inboard proximate a rear of the vehicle and rearward a location where the front section 44 angles inboard proximate a front of the vehicle 10.

Figure 5:
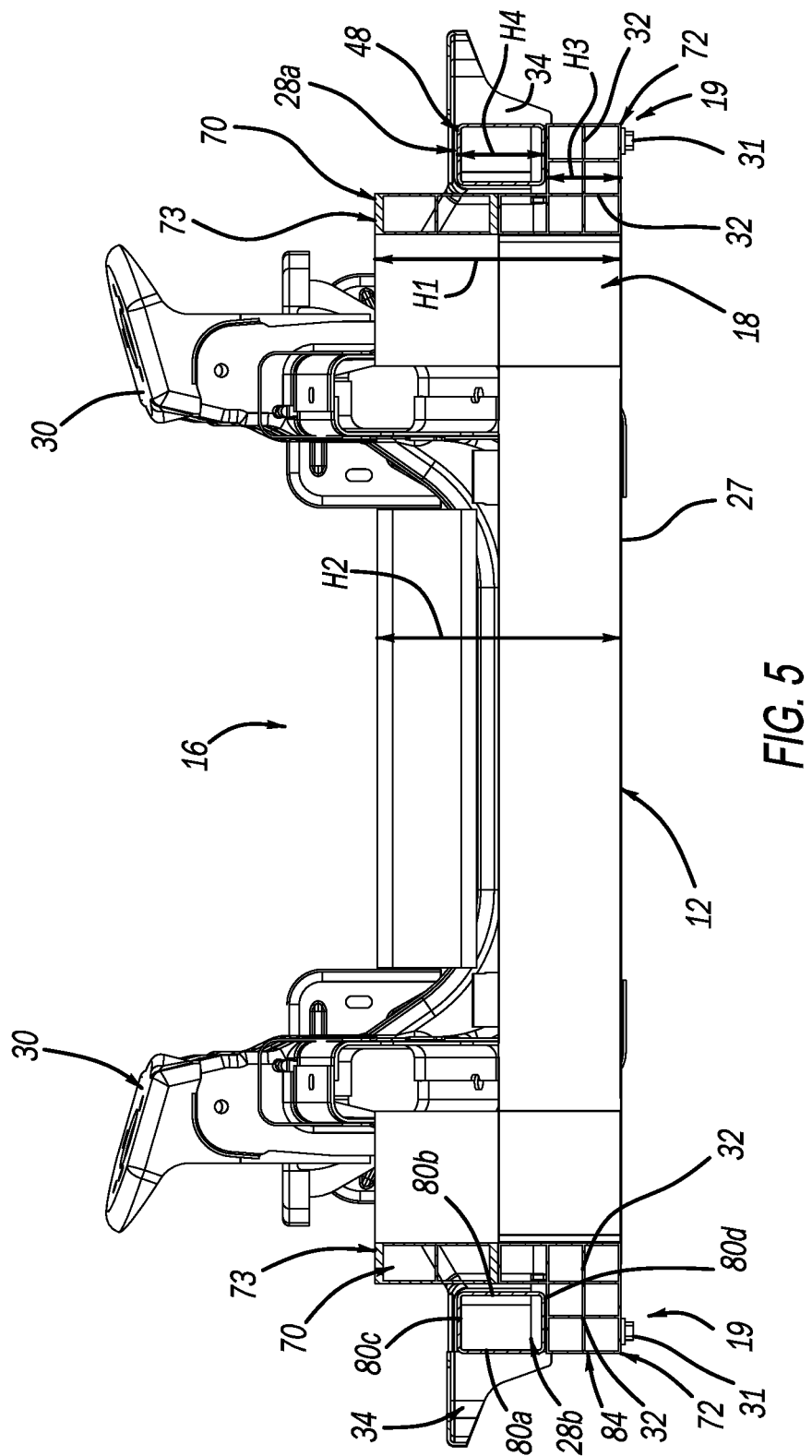
FIG. 5 is cross-sectional view of the vehicle frame and the battery structure taken along line 5-5 of FIG. 2.
Figure 6:
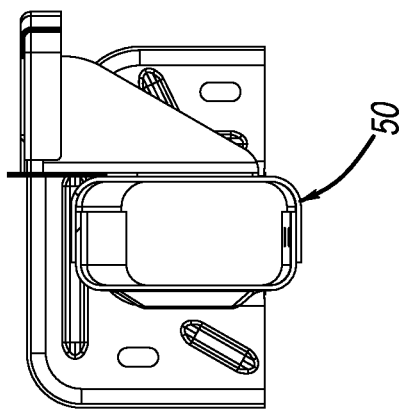
FIG. 6 is cross-sectional view of the vehicle frame and the battery structure taken along line 6-6 of FIG. 2.
Figure 6:
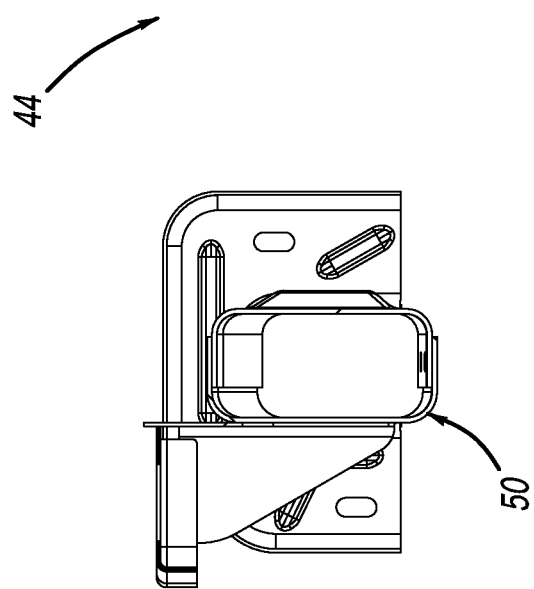
Figure 7:
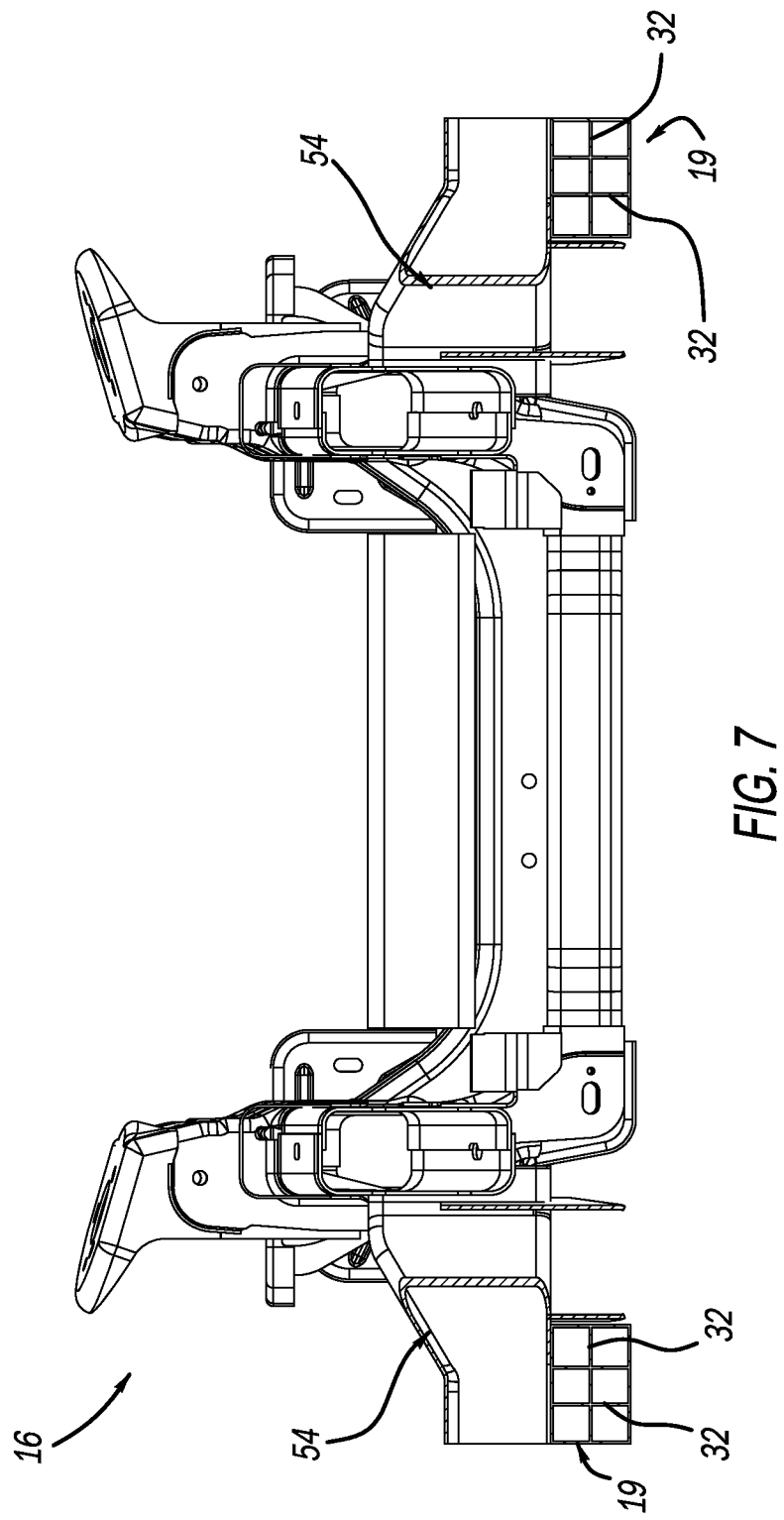
FIG. 7 is cross-sectional view of the vehicle frame and the battery structure taken along line 7-7 of FIG. 2.

Each longitudinal rail 28a, 28b is supported on the outboard portion 72 of a corresponding mounting structure 19 and has a substantially rectangular or square cross-section. In some forms, the cross-sectional area of each longitudinal member 50 of the front section 44 is greater than or less than a cross-sectional area of each longitudinal rail 28a, 28b. In some forms, the cross-sectional area of each longitudinal member 60 of the rear section 46 is greater than or less than the cross-sectional area of each longitudinal rail 28a, 28b. In other forms, the cross-sectional area of each longitudinal rail 28a, 28b is equal to the cross-sectional area of the longitudinal members 50 and equal to the cross-sectional area of the longitudinal members 60. Each longitudinal rail 28a, 28b has a length that is greater than the length of the inboard portion 70 of the mounting structure 19 and less than the length of the outboard portion 72 of the mounting structure 19. In this way, each longitudinal rail 28a, 28b extends forward and rearward of the inboard portion 70 but not the outboard portion 70. As shown in FIG. 5, each rail 28a, 28b also has a height H4 that is less than the height H1 of the inboard portion 70 of the mounting structure 19. In this way, each rail 28a, 28b is positioned below an uppermost region or top 73 of the inboard portion 70 and below the mounts 34 while supported on the outboard portion 72.

Each rail 28a, 28b includes a plurality walls (i.e., outboard vertical wall 80a, an inboard vertical wall 80b, an upper horizontal wall 80c, and a lower horizontal wall 80d) that cooperate with each other to define an internal cavity. Each rail 28a, 28b can be substantially flush with an outer periphery 84 of the outboard portion 72 of the corresponding mounting structure 19. Stated differently, the outboard vertical wall 80a of each rail 28a, 28b can be substantially flush with the outer periphery 84 of the outboard portion 72 of the corresponding mounting structure 19. In the example illustrated, the inboard vertical wall 80b of each rail 28a, 28b is spaced apart from the inboard portion 70 of the corresponding mounting structure 19. In some forms, the inboard vertical wall 80b of each rail 28a, 28b contacts the inboard portion 70 of the corresponding mounting structure 19. The upper horizontal wall 80c of each rail 28a, 28b is positioned below the uppermost region 73 of the inboard portion 70. Each rail 28a, 28b overlaps the outboard portion 72 of the corresponding mounting structure 19 such that the fasteners 31 extend vertically through the outboard portion 72 and the rail 28a, 28b, thereby securing the vehicle frame 16 and the battery structure 12 to each other.

A structural assembly of the present disclosure includes the vehicle frame 16 and the vehicle body 14. The midsection 48 (i.e., the section of the rails 28a, 28b located at opposing sides of the battery structure 12) and the battery structure 12 being combined into a unitized structure improves the strength and the stiffness of the unitized structure while reducing the overall width of the vehicle 10, of the battery structure 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for an electric vehicle, the structural assembly comprising:
   a vehicle frame including opposed longitudinal rails, each longitudinal rail of the opposed longitudinal rails including a first second and a second section;
   a battery structure disposed between the opposed longitudinal rails, the battery structure comprising a battery housing configured to house power storage units;
   a pair of mounting structures, each mounting structure of the pair of mounting structures secured to a respective side of the battery housing and including an inboard portion and an outboard portion, the outboard portion supporting a corresponding longitudinal rail of the opposed longitudinal rails; and
   a plurality of fasteners extending through a corresponding mounting structure of the pair of mounting structures and a corresponding longitudinal rail of the opposed longitudinal rails to secure the vehicle frame and the battery structure to each other,
   wherein an outer periphery of the corresponding mounting structure is substantially flush with an outer periphery of the corresponding longitudinal rail, and
   wherein the second section of each longitudinal rail of the opposed longitudinal rails has a length that is greater than a length of the inboard portion and less than a length of the outboard portion.

2. The structural assembly of claim 1, wherein each mounting structure of the pair of mounting structures includes internal stiffening members.

3. The structural assembly of claim 1, wherein:
   the inboard portion having has a first height substantially equal to a height of the battery housing; and
   the outboard portion has a second height, the first height being greater than the second height.

4. The structural assembly of claim 3, wherein the plurality of fasteners extend through the outboard portion of the corresponding mounting structure of the pair of mounting structures and the corresponding longitudinal rail of the opposed longitudinal rails to secure the vehicle frame and the battery structure to each other.

5. The structural assembly of claim 3, wherein the corresponding longitudinal rail of the opposed longitudinal rails being spaced apart from the inboard portion of the corresponding mounting structure.

6. The structural assembly of claim 3, wherein the corresponding longitudinal rail of the opposed longitudinal rails being positioned below an uppermost region of the inboard portion of the corresponding mounting structure.

7. The structural assembly of claim 1, wherein each mounting structure of the pair of mounting structures includes a first cross-sectional area and each longitudinal rail of the opposed longitudinal rails includes a second cross-sectional area, and wherein the first cross-sectional area is greater than the second cross-sectional area.

8. The structural assembly of claim 1, further comprising a plurality of mounts secured to the opposed longitudinal rails.

9. The structural assembly of claim 1, further comprising:
   a plurality of mounts secured to the opposed longitudinal rails; and
   a plurality of body isolators, each body isolator disposed on a respective mount and between the respective mount and a vehicle body.

10. The structural assembly of claim 1, wherein the first section of the vehicle frame includes a front section including a first width and the second section of the vehicle frame includes a mid-section having a second width that is greater than the first width, and wherein the battery structure is secured to the mid-section of the vehicle frame.

11. A structural assembly for an electric vehicle, the structural assembly comprising:
   a vehicle frame distinct from a vehicle body, the vehicle frame including opposed longitudinal rails, each longitudinal rail of the opposed longitudinal rails including a first second and a second section;
   a battery structure disposed between the opposed longitudinal rails, the battery structure comprising a battery housing configured to house power storage units;
   a pair of mounting structures, each mounting structure of the pair of mounting structures proximate a respective side of the battery housing and including internal stiffening members, each mounting structure further includes:

an inboard portion having a first height substantially equal to a height of the battery housing; and an outboard portion having a second height, the first height being greater than the second height, the outboard portion supporting a corresponding longitudinal rail of the opposed longitudinal rails; and a plurality of fasteners extending through the outboard portion of a corresponding mounting structure of the pair of mounting structures and a corresponding longitudinal rail of the opposed longitudinal rails to secure the vehicle frame and the battery structure to each other, wherein the second section of each longitudinal rail of the opposed longitudinal rails has a length that is greater than a length of the inboard portion and less than a length of the outboard portion.

12. The structural assembly of claim 11, wherein the corresponding longitudinal rail of the opposed longitudinal rails being spaced apart from the inboard portion of the corresponding mounting structure.

13. The structural assembly of claim 11, wherein the corresponding longitudinal rail of the opposed longitudinal rails being positioned below an uppermost region of the inboard portion of the corresponding mounting structure.

14. The structural assembly of claim 11, further comprising a plurality of mounts secured to the opposed longitudinal rails.

15. The structural assembly of claim 11, further comprising:
    a plurality of mounts secured to the opposed longitudinal rails; and
    a plurality of body isolators, each body isolator disposed on a respective mount and between the respective mount and the vehicle body.

16. The structural assembly of claim 11, wherein the first section of the vehicle frame includes a front section including a first width and the second section of the vehicle frame includes a mid-section having a second width that is greater than the first width, and wherein the battery structure is secured to the mid-section of the vehicle frame.

17. The structural assembly of claim 11, wherein a periphery of the outboard portion of the corresponding mounting structure is substantially flush with an outer periphery of the corresponding longitudinal rail.

18. An electric vehicle comprising:
    a vehicle body;
    a vehicle frame distinct from the vehicle body, the vehicle frame including opposed longitudinal rails, each longitudinal rail of the opposed longitudinal rails including a first second and a second section;
    a battery structure disposed between the opposed longitudinal rails, the battery structure comprising a battery housing configured to house power storage units and a pair of mounting structures, each mounting structure of the pair of mounting structures secured to a respective side of the battery housing and supporting a corresponding longitudinal rail of the opposed longitudinal rails, each mounting structure of the pair of mounting structures including an inboard portion and an outboard portion, the outboard portion supporting the second section of a corresponding longitudinal rail of the opposed longitudinal rails; and
    a plurality of fasteners extending through a corresponding mounting structure of the pair of mounting structures and a corresponding longitudinal rail of the opposed longitudinal rails to secure the vehicle frame and the battery structure to each other,
    wherein an outer periphery of the corresponding mounting structure is substantially flush with an outer periphery of the corresponding longitudinal rail, and
    wherein the second section of each longitudinal rail of the opposed longitudinal rails has a length that is greater than a length of the inboard portion and less than a length of the outboard portion.

19. The electric vehicle of claim 18, further comprising:
    a plurality of mounts secured to the opposed longitudinal rails; and
    a plurality of body isolators, each body isolator disposed on a respective mount and between the respective mount and the vehicle body.

20. The electric vehicle of claim 19, wherein the vehicle body includes a pair of opposed rockers, and wherein each rocker of the opposed rockers is supported by the vehicle frame by the plurality of mounts and the plurality of body isolators.

* * * * *